July 2, 1974 A. J. SCALORA Re. 28,063

METHOD AND APPARATUS FOR MAKING A BLOWN ARTICLE

Original Filed Aug. 11, 1967 2 Sheets-Sheet 1

INVENTOR
ANTHONY J. SCALORA
BY Donald K. Wedding
& W. A. Schenck
ATTORNEYS

METHOD AND APPARATUS FOR MAKING A BLOWN ARTICLE

Original Filed Aug. 11, 1967 2 Sheets-Sheet 2

INVENTOR.
ANTHONY J. SCALORA
BY Donald K. Wedding
& W.A. Schaich
ATTORNEYS

United States Patent Office

Re. 28,063
Reissued July 2, 1974

28,063
METHOD AND APPARATUS FOR MAKING A BLOWN ARTICLE

Anthony J. Scalora, Toledo, Ohio, assignor to Owens-Illinois, Inc.

Original No. 3,470,282, dated Sept. 30, 1969, Ser. No. 659,968, Aug. 11, 1967, which is a continuation-in-part of abandoned application Ser. No. 275,735, Apr. 25, 1963. Application for reissue Sept. 27, 1971, Ser. No. 184,310

Int. Cl. B29c *17/04;* B29d *23/03*

U.S. Cl. 264—97 6 Claims

Matter enclosed in heavy brackets [ ] appears in the original patent but forms no part of this reissue specification; matter printed in italics indicates the additions made by reissue.

ABSTRACT OF THE DISCLOSURE

This invention comprises the preparation of a biaxially oriented, thermoplastic, container-shaped article by injection molding a homogeneous melt to form a hollow body or parison, cooling the body to a temperature range wherein the thermoplastic can be biaxially oriented by stretching and inflating, said range being below the homogeneous melt temperature, and then stretching the cooled body along its longitudinal axis and inflating it radially with respect to such longitudinal axis so as to obtain uniform biaxial orientation of the thermoplastic body. The preferred thermoplastic is polyvinyl chloride.

Related application

This application is a *re-issue of U.S. Pat. 3,470,282, issued Sept. 30, 1969, matured from U.S. Patent application Ser. No. 659,968, filed Aug. 11, 1967, which is a* continuation-in-part of copending U.S. Patent application Ser. No. 275,735, filed Apr. 25, 1963, now abandoned.

The invention

This invention relates to a process for preparing a novel article of manufacture from thermoplastic material. More particularly this invention relates to a process for biaxially orienting thermoplastic material during the formation of a blown or inflated container-like article such that the article has improved properties and characteristics, especially physical strength.

The phenomenon of biaxial orientation in thermoplastic material has long been recognized. It is known in the prior art that sheet and tubular materials, such as polyethylene, polypropylene and polystyrene undergo substantial molecular transformation and exhibit marked increase in physical properties if the sheet is stretched both longitudinally and transversely after being formed. See, for example, U.S. Letters Patents 3,231,642 and 3,283,317. One accepted explanation of the increase in physical properties is that the stretching causes alignment of the polymeric chain in the direction of stretching and that the aligned chain is better able to resist tensile strain and rupture relative to the originally randomly oriented polymeric chain.

However, herebefore, the prior art has not effectively prepared containers or like shaped-articles which are biaxially oriented substantially throughout; that is, the art has frequently prepared containers using a tubular extrusion and orientation technique followed by a pinching or like operation to close off and seal at least one end of the tube. Such pinched and sealed off portion typically has a low strength, e.g. impact strength, relative to the rest of the oriented container.

In accordance with this invention, there is prepared a container or like-shaped article of thermoplastic material using an injection molding technique, said article having relatively balanced axial orientation substantially throughout the thermoplastic material including any gate portion thereof which may be formed during the injection molding.

Thermoplastic as used herein is defined as including polyethylene, polypropylene, polystyrene, polyvinyl chloride, and other well known thermoplastic materials, e.g. as disclosed for example in U.S. Letters Patent 3,231,642.

In the broad practice hereof, this invention comprises the preparation of a thermoplastic container-shaped article having uniformly controlled, balanced biaxial orientation molding a homogeneous melt of thermoplastic to form a parison, cooling the parison to a temperature range where the thermoplastic material can be biaxially oriented by stretching and inflating without rupture said temperature range being below the homogeneous melt temperature, and then stretching the cooled parison along its longitudinal axis and inflating it along a second axis which is radial with respect to the longitudinal axis so as to obtain biaxial orientation of the thermoplastic article.

Biaxial orientation as used herein is defined as including at least some orientation along both the longitudinal and radial axes. Thus it is contemplated that there may be a varied amount of stretching and orientation along one axis relative to the other axis or there may be an equal amount of stretching and orientation along each axis.

In accordance with a specific embodiment hereof, this invention involves forming, by injection molding or the like, a parison or blank having axial and radial dimensions equal to not more than about one-half, preferably about one-third to one-fifth, of the dimensions of the finally stretched and inflated article.

As is customary in the injection molding of thermoplastic materials, such injection molding is carried out with the thermoplastic material being at least at its homogeneous melt temperature.

Although the exact homogeneous melt working temperature will be a function of the particular polymer, pressure, ingredients incorporated therein, and other factors, typical homogeneous melt temperatures not by way of limitations are at least about 300° F. for polyethylene and at least about 340° F. for polyvinyl chloride.

The parison or hollow body is then cooled to a temperature range where it can be oriented by axially stretching and inflating without rupture to its final configuration.

The exact temperature range at which the parison is oriented by stretching and inflating will be a function of substantially the same factors influencing the homogeneous melt temperature.

For polyvinyl chloride, it has been found that suitable results are obtained using a parison mold temperature of about 220 to 250° F.

For some crystalline-containing polymers such as polyethylene, the parison is oriented by stretching and inflating below a temperature at which crystallites are no longer detectable.

The longitudinal stretching of the parison initially accomplishes mono-axial orientation of the polymeric molecules, while the radial inflating or blowing of the parison to its final configuration completes the biaxial orientation. It is of course contemplated that some radial orientation may occur during the stretching and some longitudinal orientation during the inflating. It is also contemplated that the stretching and inflating may be more or less simultaneous.

In accordance with the aforementioned specific embodiment hereof, the degree of stretching along each axis to effect biaxial orientation ranges upwardly from a minimum of about 200% elongation, preferably about 300% to 500%, although elongations of as much as 600% or more may be used. Expressed in another manner, the degree of stretching and inflating can be defined as that sufficient to reduce the wall thickness of the parison by a factor of at least four as determined by the multiple of the stretching and inflating ratios; that is, the thickness reduction is inversely proportional to the product of the amounts or degrees of stretching and inflating.

In one preferred embodiment hereof it has been discovered that highly unexpected results can be obtained with thermoplastic material containing a substantial portion of polyvinyl chloride, e.g. at least about 85 percent by weight polyvinyl chloride based on the total weight of the material.

In accordance with such embodiment, there is prepared an injection and blow molded biaxially oriented, polyvinyl chloride container having a tensile impact strength of at least 130, typically at least 200, foot pounds per square inch (ft.-lbs. per inch$^2$) using ASTM D–1822 testing procedure, type S specimen. When such polyvinyl chloride container is tested to failure using a bottle drop impact test, e.g. where the container is filled with liquid and dropped from a suitable height such as disclosed in U.S. Letters Patent 3,288,317, column 13, lines 3 et seq., there results a high energy, brittle crack propagation which is not perpendicular to the plane of the container wall as is characteristic of a typical brittle failure of prior art containers.

For further understanding of this invention, reference is made to the drawings and the figures thereon.

The drawings

Before explaining the present invention in detail it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
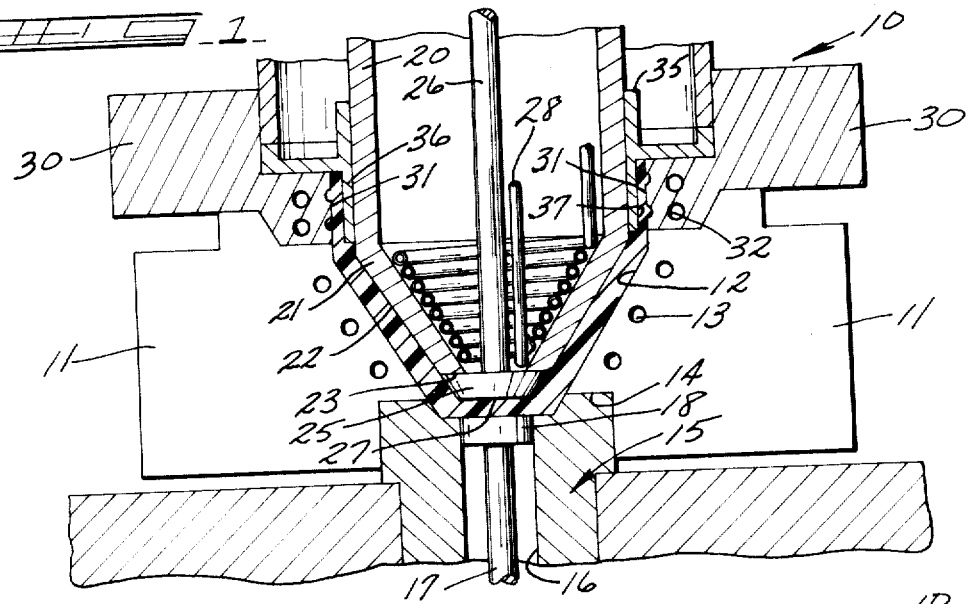
FIGURE 1 is a vertical sectional view, with parts shown in elevation, of an apparatus capable of carrying out the present invention, the apparatus being illustrated as positioned for the injection molding of a parison.

In FIGURE 1, reference numeral 10 refers generally to an apparatus similar to that illustrated and described in detail in U.S. Letters Patent 3,172,929 issued to Thomas R. Santelli.

Generally, the apparatus includes a pair of parison mold sections 11 circumscribing the outer surface of a parison mold chamber 12, preferably in the form of a truncated cone. The parison mold is provided with passages for heat exchange fluid, these passages being indicated generally at 13 and being adapted to circulate hot or cold heat exchange fluid to very accurately control the temperature of the parison mold chamber 12.

The parison mold sections 11 are recessed at their lower ends, as at 14, to receive therein the upper end of an injection cylinder, indicated generally at 15, which is axially bored, as at 16, to receive therethrough an injection plunger 17 provided with an enlarged head 18 defining, when in its elevated position of FIGURE 1, the lower extremity of the mold chamber 12.

Projecting downwardly into the mold chamber 13 is an internal sleeve 20 having its lower end tapered, as at 21, to provide a tapered exterior surface 22 forming the inner surface of the mold chamber. The tapered portion 21 of the sleeve 20 terminates in an open lower end 23 which is closed by a valve element 25 having an actuating stem 26 projecting axially through the sleeve. As illustrated in FIGURE 1 of the drawings, the valve element 25 is in its upper or retracted position abutting the open lower end 23 of the sleeve 20 and cooperating with the surface 22 of the tapered portion 21 of the sleeve 20 to define the lower extremity of the inner wall of the mold space 12. The lower exposed face 27 of the valve 25 is parallel to and in opposed relation to the free upper extremity of the plunger head 18.

Disposed interiorly of the sleeve tapered portion 21 is a heat exchange coil 28 in intimate surface contact with the inner surface of the tapered portion 21 of the sleeve 20 so as to control the temperature of the sleeve. The heat exchange passages 13 in the parison mold sections 11 and the heat exchange coil 28 interiorly of the sleeve portion 21 thus very accurately control the temperature of the mold space 13, for reasons which will hereafter become apparent.

Surrounding the sleeve 20 are a pair of separable neck mold sections 30, these sections projecting radially inwardly to terminate in semi-arcuate surfaces 31 contoured to define, for example, the exterior surface of a container neck or the like. The neck mold sections 30 are also provided with heat exchange fluid passages 32. The inner surfaces of the container neck are defined by a neck ring sleeve 35 closely peripherally surrounding the cylindrical portion of the sleeve 20 and having a depending annular flange 36 interposed betwen the neck ring sections 30 and the sleeve, so that the smooth periphery 37 of the ring defines the inner surface of the container neck.

As described in the above-identified Santelli patent, a measured charge of a plasticized thermoplastic material, e.g. polyethylene, polypropylene, polystyrene, or polyvinyl chloride, is deposited in the axial feed passage 16, and the plunger 18 is displaced vertically upwardly to move the measured charge of plasticized material into the mold space 12. Thus, the shape illustrated in FIGURE 1 is injection molded.

Preferably, a relatively cool heat exchange fluid such as water or air is circulated through the heat exchange passages 32 of the neck rings 30 to chill the neck portion in surrounding relation to the cylindrical sleeve 20. Thus, the neck portion; i.e. that portion of the parison surrounding the opening in the final container, is injection molded to its final configuration and is firmly anchored in place in the mold.

At the same time, chilled heat exchange fluid is circulated through the interior coil 28 and the exterior heat exchange passages 13 to control the temperature of the remainder of the parison to slightly less than the melt temperature of the specific material being utilized. The temperature of that portion of the parison which will subsequently be blow molded is controlled within an orientation range below the homogeneous melt temperature as described hereinbefore.

Figure 2:
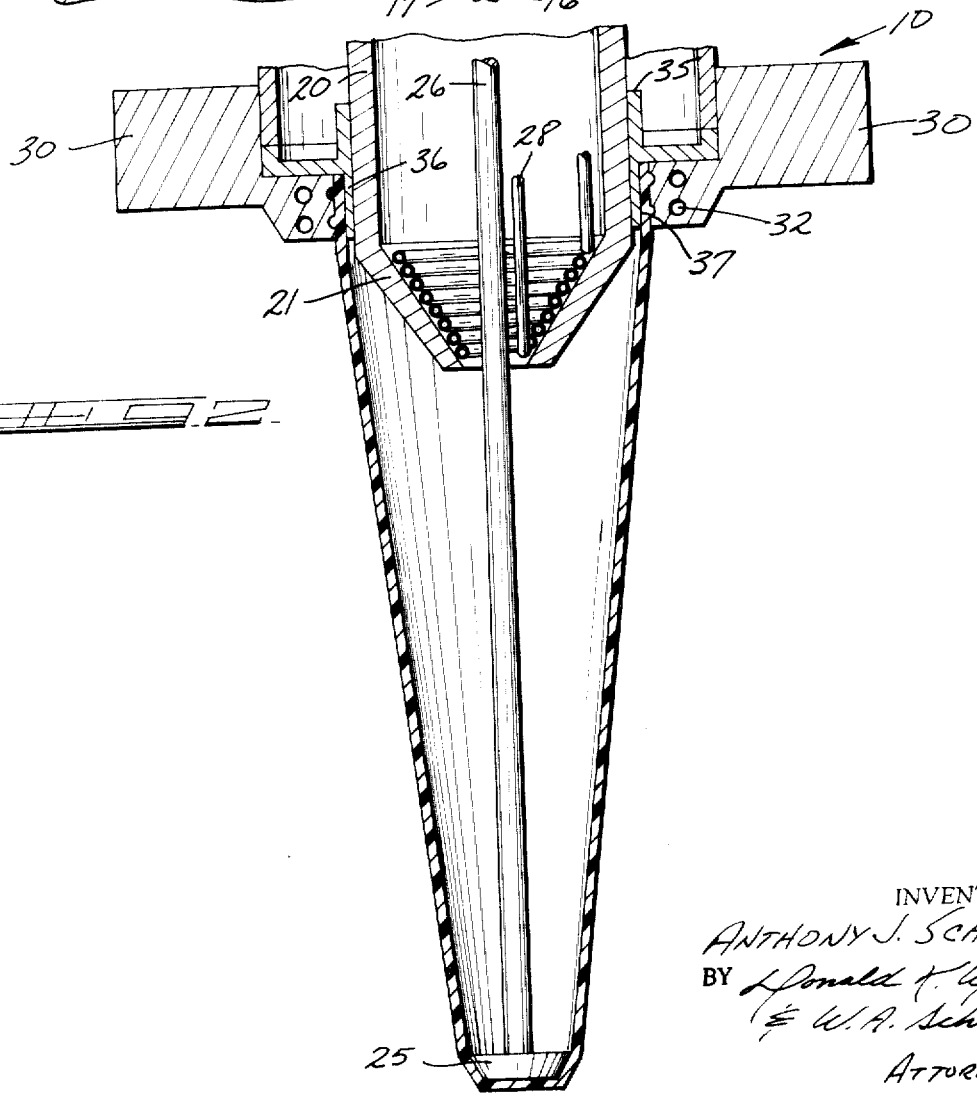
FIGURE 2 is a view similar to FIGURE 1, but illustrating the axial elongation of the parison prior to inflation of the parison.

After the desired temperature has been attained, the parison is removed from the mold preferably by vertically upwardly withdrawing the parison (as described in detail in said Santelli patent), or, alternatively, by opening the parison mold sections, and the valve element 25 (the movable parison core element) is moved relative to the sleeve 20 to the positions illustrated in FIGURE 2 of the drawings. Such relative movement stretches along the longitudinal axis those portions of the parison formed intermediate the tapered portion 21 of the sleeve and the parison mold 11, while the highly chilled portions of the material constituting the neck of the parison remain in place intermediate the cylindrical portion of the sleeve 20 and the surrounding neck mold section 30.

The extent of longitudinal or axial stretching of the parison should be in excess of about 200%, preferably about 300% to 500%, although stretching of at least about 600% can be accomplished. Thus, the wall thickness of the parison will be reduced by a factor of at least two. This axial stretching initially orients the polymeric molecules in a direction parallel to the direction of the stretching, i.e. parallel to the axis of movement of the valve element 25.

Figure 3:
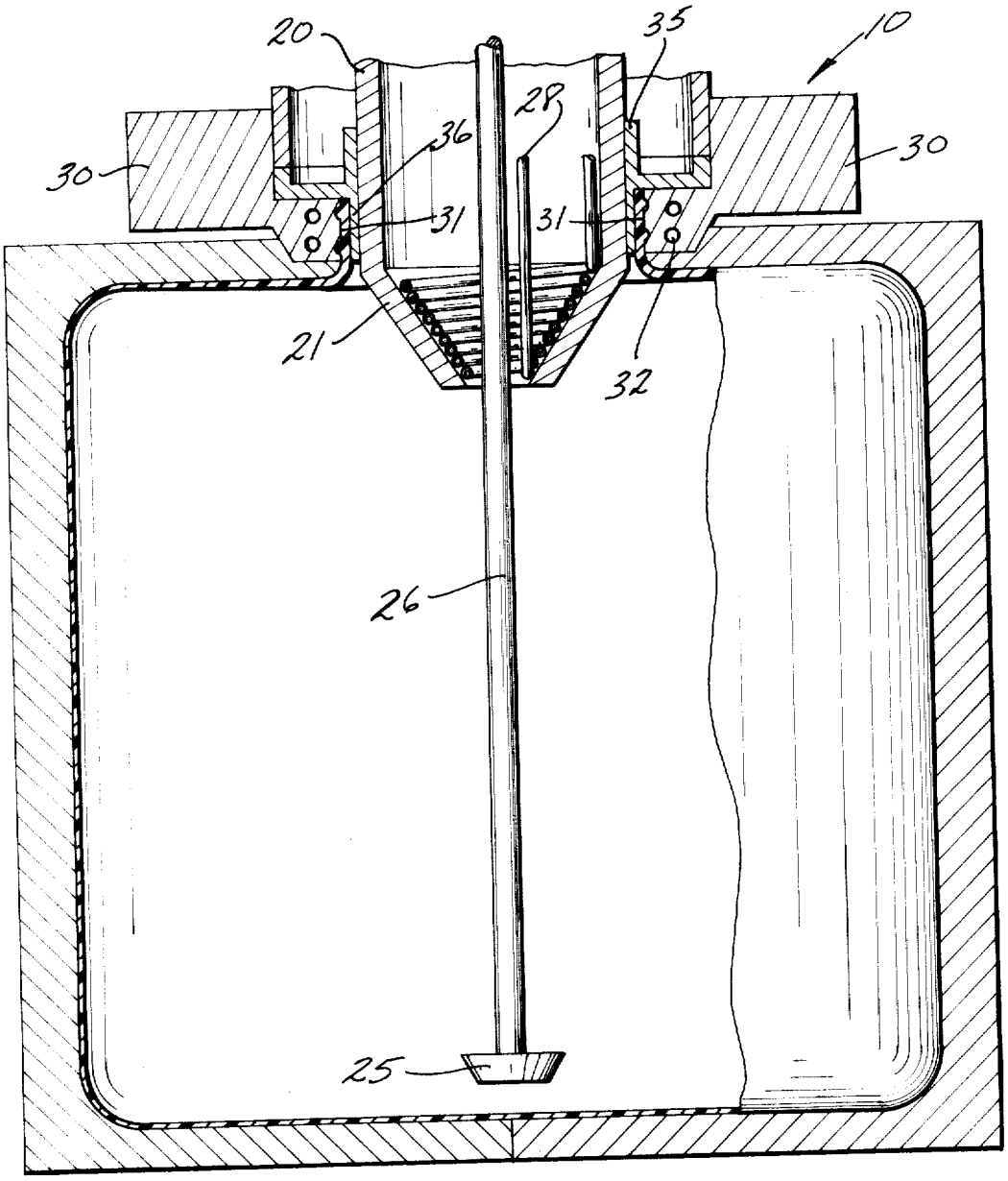
FIGURE 3 is a view similar to FIGURES 1 and 2, and illustrating the inflation and radial distention of the stretched parison to form the final article.

Subsequently, the parison is blown to its final configuration in a blow mold 40, as illustrated in FIGURE 3 of the drawings, by the injection of a gaseous medium, e.g. a pressurized fluid such as air, through the sleeve 20 and into the parison. The blowing radially inflates the parison so as to orient the polymeric molecules in a direction transverse to the orientation effected by the axial stretching of FIGURE 2. Thus, the sequential axial and radial stretching of the injection molded parison effects biaxial orientation in the final article and greatly enhanced physical characteristics result.

Several important aspects of the process illustrated in FIGURES 1, 2, and 3 must be emphasized. These are:

1. The stretching in each direction must take place while the injection molded parison is at a temperature within a narrow temperature range dependent upon the material being processed, as described hereinbefore. This requires that the portions of the parison which are to be stretched must be at a substantially constant overall temperature. Thus, the injection molding of the parison becomes critical in order to afford the necessary thermal control. This degree of thermal control cannot be obtained in a continuous forming operation, as in processes in which an extruded tube is utilized as the parison.

2. The degree of stretching, defined as being greater than 200% and preferably within the range of from 300% to 500%, is accomplished in each direction. Thus, an axial elongation of greater than 200% is required and a blow up ratio, in order to effect radial stretching, in excess of 2 to 1 is also required. The effect on wall thickness is a two-step reduction by a factor of at least two in each direction with total wall thickness reduction of four. *The parison sidewalls and bottom walls are of an average wall thickness which is substantially greater than the average thickness of the side and bottom walls of the blown article. The stretching of the parison both radially and axially reduces the average wall thickness of the side walls and bottom walls of the blown article.*

3. The sequential stretching and inflating steps may be carried out separately or in combination. Thus, the stretching of FIGURE 2 may be carried out after the parison is enclosed in a blow mold, although there is no reason why the axial stretching cannot be carried out, at least in part, during the transfer operation from the parison mold to the blow mold.

From the foregoing description, it will be readily appreciated by those skilled in the art that the present invention provides a new and novel method of making a plastic article of greatly enhanced physical characteristics.

I claim:

1. A process for preparing a biaxially oriented, hollow, container-shaped, thermoplastic article of substantially increased strength comprising the steps of injection molding a homogeneous melt of a molecularly orientable thermoplastic material to form a parison, cooling the parison to a temperature range at which the thermoplastic material is highly molecularly orientable in a direction in which stretched, said range being below the homogeneous melt temperature, and then first stretching the parison along a longitudinal axis at least 200% relative to the original length sufficient to reduce the wall thickness of the parison at least 50% relative to the original wall thickness of the parison so as to form an elongated tube having one closed end in which the material of the tube is uniaxially molecularly oriented and, subsequently to completion of the stretching operation, radially expanding the elongated tube including the closed end by inflation with respect to said longitudinal axis sufficient to increase the diameter of said stretched elongated tube in excess of 200% relative to the original diameter such that the wall thickness of the stretched and expanded parison is 25% or less of the original parison thickness, thereby producing substantially complete biaxial orientation in the material of the inflated thermoplastic article.

2. The process of claim 1 wherein the degree of said longitudinal stretching and of said radial expansion is at least 300%.

3. The process of claim 2 wherein the thermoplastic material comprises at least 85% polyvinyl chloride by weight and said temperature range is between 220° and 250° F.

4. In a process of producing a hollow, blown plastic article from a molecularly orientable thermoplastic material by injecting molding a hollow parison having a closed bottom end about a core having an axially moveable end element abutting the closed bottom end of the parison and then blowing the parison, the improvement of cooling the molded parison to a temperature below the homogeneous melt temperature of the thermoplastic material at which the material is highly orientable without rupture in the direction of stretch, maintaining said parison at said temperature while (1) axially stretching said parison including the side and bottom wall by axially moving the core element through a distance at least three times the axial extent of the parison while retaining fixed the other axial extremity of the parison so that the walls of said parison are stretched to substantially the axial extent of said article and the material uniaxially molecularly oriented and thereafter (2) radially expanding and stretching the side and bottom walls of the stretched parison by injecting a gaseous medium under pressure into the stretched parison to inflate the parison to a transverse dimension at least three times of that of the stretched parison and establish substantially complete biaxial molecular orientation of the material in the inflated article.

*5. A process for preparing a biaxially oriented, hollow, blown plastic article from a molecularly orientable thermoplastic material, comprising the steps of injection molding a homogeneous melt of said molecularly orientable thermoplastic material to form a parison having side walls merging into a closed bottom wall, the average wall thickness of the side and bottom walls of said parison being substantially greater than the average thickness of the side and bottom walls of said article, and stretching the parison both axially and radially to reduce the average wall thickness of the side walls and bottom walls of said parison to the average thickness of the side and bottom walls of said article, the stretching taking place while the parison walls are at a temperature at which the thermoplastic material is highly molecularly orientable in all directions when stretched and the stretching being at least partially carried out in a blow mold enclosing the parison and defining the shape of the final article, thereby biaxially orienting the material of the inflated thermoplastic article.*

*6. In a method of making a hollow, blown plastic article from a molecularly orientable plastic material which is orientable in all directions in which stretched, the steps of injection molding a homogeneous melt of said molecularly orientable thermoplastic material to form a parison having side walls merging into a closed bottom wall, cooling the parison to a temperature range in which the thermoplastic material is highly molecularly orientable in all directions in which stretched, and then stretching the parison both axially and radially to reduce the average wall thickness of the side walls and bottom walls of said parison to the average thickness of the side walls and bottom walls of the finished article, said step of stretching*

*said parison being at least partially carried out by inflating the parison at a blow ratio of at least 2 to 1 in a blow mold defining the shape of the final article.*

References Cited

The following references, cited by the Examiner, are of record in the patented file of this patent or the original patent.

UNITED STATES PATENTS

| | | | |
|---|---|---|---|
| 2,331,688 | 10/1943 | Hobson | 18—5 |
| 2,878,513 | 3/1959 | Slaughter | 18—19 |

| | | | |
|---|---|---|---|
| 3,172,929 | 3/1965 | Santelli | 264—97 |
| 3,244,778 | 4/1966 | Ninneman | 264—97 X |
| 3,341,644 | 9/1967 | Allen | 264—97 |

ROBERT F. WHITE, Primary Examiner

J. H. SILBAUGH, Assistant Examiner

U.S. Cl. X.R.

425—DIG. 208, DIG. 209, DIG. 216